(12) United States Patent
Liu et al.

(10) Patent No.: US 11,934,283 B2
(45) Date of Patent: Mar. 19, 2024

(54) COST-OPTIMIZED TRUE ZERO RECOVERY TIME OBJECTIVE FOR MULTIPLE APPLICATIONS USING FAILURE DOMAINS

(71) Applicant: EMC IP Holding Company LLC, Hopkinton, MA (US)

(72) Inventors: Bing Liu, Tianjin (CN); Jehuda Shemer, Kfar Saba (IL); Kfir Wolfson, Beer Sheva (IL); Jawad Said, Kfar Yasif (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 269 days.

(21) Appl. No.: 16/878,231

(22) Filed: May 19, 2020

(65) Prior Publication Data
US 2021/0365340 A1     Nov. 25, 2021

(51) Int. Cl.
*G06F 11/30* (2006.01)
*G06F 9/455* (2018.01)
*G06F 11/14* (2006.01)

(52) U.S. Cl.
CPC ........ *G06F 11/301* (2013.01); *G06F 9/45558* (2013.01); *G06F 11/1484* (2013.01); *G06F 11/3055* (2013.01); *G06F 2009/45562* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | |
|---|---|---|
| 8,230,256 B1 | 7/2012 | Raut |
| 8,402,306 B1 * | 3/2013 | Kruck ................. G06F 11/1438 718/103 |
| 9,201,736 B1 | 12/2015 | Moore et al. |
| 9,639,592 B1 | 5/2017 | Natanzon et al. |
| 9,727,429 B1 | 8/2017 | Moore et al. |
| 9,792,131 B1 | 10/2017 | Uchronski et al. |
| 9,959,061 B1 | 5/2018 | Natanzon et al. |
| 9,977,704 B1 | 5/2018 | Chopra et al. |
| 10,067,836 B1 | 9/2018 | Chopra et al. |
| 10,120,925 B1 | 11/2018 | Natanzon et al. |
| 10,853,111 B1 | 12/2020 | Gupta et al. |
| 11,036,419 B1 | 6/2021 | Srikantan et al. |

(Continued)

FOREIGN PATENT DOCUMENTS

| | | |
|---|---|---|
| FR | 2937442 A1 | 4/2010 |
| WO | 2017/106997 A1 | 6/2017 |

OTHER PUBLICATIONS

International Search Report and Written Opinion received for PCT Patent Application No. PCT/US21/029079, dated Aug. 12, 2021 18 pages.

(Continued)

*Primary Examiner* — Lewis A Bullock, Jr.
*Assistant Examiner* — Melissa A Headly
(74) *Attorney, Agent, or Firm* — Workman Nydegger

(57) ABSTRACT

Data protection operations including replication operations are disclosed. Virtual machines, applications, and/or application data are replicated according to at least one strategy. The replication strategy can improve performance of the recovery operation.

18 Claims, 9 Drawing Sheets

(56) References Cited

U.S. PATENT DOCUMENTS

| | | |
|---|---|---|
| 11,182,188 B2 | 11/2021 | Weissman et al. |
| 11,210,150 B1 | 12/2021 | Setty et al. |
| 11,610,121 B2 | 3/2023 | Teppoeva et al. |
| 11,663,099 B2 | 5/2023 | Polimera et al. |
| 11,669,414 B2 | 6/2023 | Bhagi et al. |
| 2003/0051187 A1 | 3/2003 | Mashayekhi et al. |
| 2012/0084414 A1 | 4/2012 | Brock et al. |
| 2012/0151474 A1 | 6/2012 | Biran et al. |
| 2012/0204061 A1 | 8/2012 | Agesen et al. |
| 2013/0151975 A1 | 6/2013 | Shadi et al. |
| 2013/0185716 A1 | 7/2013 | Yin et al. |
| 2014/0040206 A1 | 2/2014 | Ramakrishnan et al. |
| 2014/0344805 A1 | 11/2014 | Shu et al. |
| 2015/0033133 A1 | 1/2015 | Thakur et al. |
| 2015/0341377 A1 | 11/2015 | Kasturi et al. |
| 2016/0048438 A1 | 2/2016 | Martos et al. |
| 2016/0314057 A1 | 10/2016 | De et al. |
| 2016/0371020 A1* | 12/2016 | Sarkar .................. G06F 11/2094 |
| 2017/0091221 A1 | 3/2017 | Yin et al. |
| 2017/0185488 A1 | 6/2017 | Kumarasamy et al. |
| 2017/0242599 A1 | 8/2017 | Patnaik et al. |
| 2017/0300347 A1 | 10/2017 | Tian et al. |
| 2017/0371567 A1 | 12/2017 | Piduri |
| 2018/0129539 A1 | 5/2018 | Sadat |
| 2018/0285353 A1 | 10/2018 | Ramohalli et al. |
| 2018/0332073 A1 | 11/2018 | Ahmed |
| 2019/0163372 A1 | 5/2019 | Sridharan |
| 2019/0235904 A1 | 8/2019 | Epping et al. |
| 2019/0324785 A1* | 10/2019 | Weissman ........... G06F 9/45558 |
| 2020/0004648 A1 | 1/2020 | Xu et al. |
| 2020/0042632 A1 | 2/2020 | Natanzon et al. |
| 2020/0110655 A1 | 4/2020 | Harwood et al. |
| 2020/0110675 A1 | 4/2020 | Wang et al. |
| 2020/0218711 A1 | 7/2020 | Natanzon |
| 2021/0200616 A1 | 7/2021 | Xu et al. |
| 2021/0208981 A1 | 7/2021 | Karasev et al. |
| 2021/0208983 A1 | 7/2021 | Lin et al. |
| 2021/0248047 A1 | 8/2021 | Jayaram et al. |
| 2021/0258219 A1 | 8/2021 | Kumarasamy et al. |
| 2021/0383206 A1 | 12/2021 | Teppoeva et al. |
| 2022/0091915 A1 | 3/2022 | Perneti et al. |
| 2023/0107511 A1 | 4/2023 | Mitkar et al. |
| 2023/0109510 A1 | 4/2023 | Polimera et al. |

OTHER PUBLICATIONS

Zhang Fei et al: "A Survey on Virtual Machine Migration: Challenges, Techniquesl, and Open Issues", IEEE Communications Surveys & Tutorials, vol. 20, No. 2, May 22, 2018 pp. 1206-1243.

U.S. patent Application filed on May 19, 2020, by Bing Liu, Entitled "Cost-Optimized True Zero Recovery Time Objective for Multiple Applications Based on Interdependent Applications", U.S. Appl. No. 16/878,297.

U.S. patent Application filed on May 19, 2020, by Bing Liu, Entitled "Cost-Optimized True Zero Recovery Time Objective for Multiple Applications Using Failure Domains", U.S. Appl. No. 16/878,231.

U.S. patent Application filed on May 19, 2020, by Bing Liu, Entitled "Cost-Optimized True Zero Recovery Time Objective for Multiple Applications", U.S. Appl. No. 16/878,184.

U.S. patent Application filed on May 19, 2020, by Bing Liu, Entitled "Dynamic Cost-Optimized True Zero Recovery Time Objective for Multiple Applications", U.S. Appl. No. 16/878,206.

International Preliminary Report on Patentability received for PCT Patent Application No. PCT/US2021/029079, dated Dec. 1, 2022, 12 pages.

* cited by examiner

COST-OPTIMIZED TRUE ZERO RECOVERY TIME OBJECTIVE FOR MULTIPLE APPLICATIONS USING FAILURE DOMAINS

FIELD OF THE INVENTION

Embodiments of the present invention generally relate to data protection and data protection operations. More particularly, at least some embodiments of the invention relate to systems, hardware, software, computer-readable media, and methods for protecting data including recovery operations for multiple applications.

BACKGROUND

Data protection systems can protect data in a variety of different manners. The process of protecting data is generally provides the ability to backup and recover data. However, there are a variety of data protection operations and many ways to backup/recover data. In fact, one of the concerns related to backing up data, in addition to having a valid backup, is the ability to restore the data. Recovering applications or failing over applications allows the applications to resume operation. However, the longer it takes to perform a recovery operation or a failover operation, the greater the damage to an entity.

One of the metrics used to characterize the restore operation is Recovery Time Objective (RTO). The RTO indicates a point in time at which operation may resume or the point in time at which the recovery operation is completed. Data protection operations often seek to find ways to reduce the RTO.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations including data backup and restore operations. More particularly, at least some embodiments of the invention relate to systems, hardware, software, computer-readable media, and methods for data protection and to performing data protection operations. Examples of data protection operations include, but are not limited to, backup operations, replication operations, any point in time (PiT) recovery operations, journaling operations, restore or recovery operations, disaster recovery operations, failover operations, failback operations, or the like or combination thereof. Embodiments of the invention may be implemented in a variety of different networks and configurations including physical and/or virtual systems, virtual machines (VMs), local area networks, wide area networks, cellular networks, cloud-based systems and networks including datacenters, or the like or combination thereof.

In general, example embodiments of the invention relate to systems and methods for protecting data in a manner that improves Recovery Time Objective (RTO) while also managing cost. A PiT data protection system may replicate 10 (Input/Output) from a production site that is associated with or includes multiple virtual machines to a replica site that may include multiple replica virtual machines. In the PiT data protection system, when operating, the replica virtual machine disks are updated with new data that has been written to the production virtual machine disks. Access to the replica virtual machine disks is typically blocked by a software component such as a splitter to avoid inconsistencies and unwanted data changes.

In one example, the replica virtual machine may be powered off or in a "shadow" mode. In shadow mode, the virtual machine disks or volumes exist and can be written to, but the operating system (OS) is not running. Recovering from the replica virtual machine or failing over to the replica virtual machine will require powering on the virtual machine and booting the OS. This is a process that may take significant time. Even though a data protection system may protect the whole virtual machine, it is often advantageous to protect a production application, which typically runs on the production virtual machine.

When operating in shadow mode, the RTO may include both the start up time of the virtual machine, the boot time of the OS and the start time of the application. Embodiments of the invention reduce the RTO and the associated costs.

Figure 1:
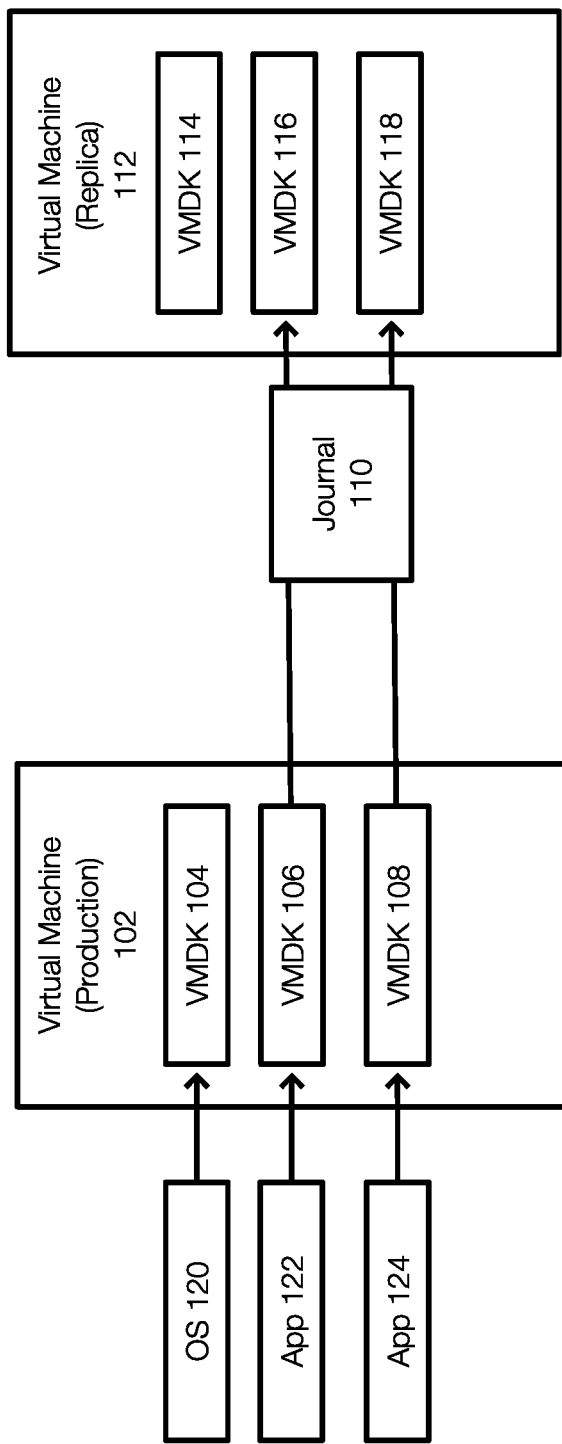
FIG. 1 illustrates an example of a data protection system configured to replicate a production virtual machine to a replica virtual machine.

FIG. 1 illustrates an example of reducing the RTO for a single protected virtual machine. FIG. 1 illustrates a production virtual machine 102 that is replicated to a replica virtual machine 112. The virtual machines 102 may be on-premise, cloud-based, or the like. The virtual machine includes an OS 120 and is running applications (apps) 122 and 124. FIG. 1 illustrates VMDKs, which are examples of virtual disks or volumes. A VMDK is an example of a virtual machine disk and is a file format that a describes a container or format for virtual hard drives used with virtual machines. Embodiments of the invention are not limited to any particular format.

In FIG. 1, the OS 120 is associated with a virtual disk (VMDK) 102, the app 122 is associated with a virtual disk 106, and the app 124 is associated with a virtual disk 108. However, the apps 122 and 124 may also run on the OS disk or volume and the data of the apps 122 and 124 may be on, respectively, virtual disks 106 and 108. Thus, the apps 122 and 124 may be installed on the OS virtual disk 104.

The replica virtual machine 112 is associated with virtual disks 114, 116, and 118. During replication, the production data written to the virtual disks 106 and 108 may be journaled in a journal 110 and written to, respectively, virtual disks 116 and 118. Thus, the applications 122 and 124 are effectively replicated to the replica virtual machine 112. Binaries of the applications 122 and 124 may be stored or installed on the virtual disk 114, which is also an OS disk for the replica virtual machine 112. The applications 122 and 124 could also be stored on the data virtual volumes or disks 116 and 118.

To improve the RTO, FIG. 1 illustrates that the data associated with the apps 122 and 124 are replicated to different virtual disks on the replica virtual machine 112. The RTO of a protected application can be reduced by separating the protected applications' data to different virtual disks or volumes. Further, the OS on the replica virtual machine 112 may already be running and ready to recover on demand. Further, embodiments of the invention may select a trigger to rescan the disks from the OS and application perspectives. When an OS mounts a filesystem or attaches to a disk the OS sends a set of commands to identify and inquire information about the newly added device. This include figuring out the device size, type, layout/format, different identifiers, modes of operation etc. Filesystems usually have this information as part of their first few blocks while block devices have commands to figure this out (SCSI inquiry command for example). On Linux systems this is triggered on mount commands or managed by fstab, and on Windows by the Windows Volume Manager. This information gathering is many times referred to as a rescan.

The RTO, in this example, allows an RTO of seconds to be achieved instead of minutes by removing the need to configure hardware, POST, boot the OS, perform network discovery and connection, login or the like.

In one example, virtual machines that only have a single disk can often be configured to have a supported configuration or configured with a different configuration. This may include adding at least one more virtual disk, formatting the added disk with a file system and setting the application data source to reside on the added disk. The examples discussed herein may include a single OS disk, but embodiments of the invention are not limited to a single OS disk. However, the OS and an application typically reside on a predefined fixed number of disks. These and/or the data disks can be tagged for identification purposes. Further, references to virtual disks may also include references to virtual volumes.

The data protection system of FIG. 1 may reduce the RTO for a single protected virtual machine. Protecting multiple virtual machines where the OS is running and the applications are installed requires multiple replica virtual machines running on a tier-1 disaster recovery datacenter. To achieve minimal RTO, the virtual machines are powered up and the OS is running. This may include memory and processor reservations. In effect, the replica virtual machine is or is close to being a fully operational virtual machine. As previously stated, this has an associated cost. Running operational or nearly operational virtual machines in the cloud when performing data protection operations such as replication may have a high cost.

Embodiments of the invention optimize or reduce this cost by sharing replica virtual machines with several applications. In other words, multiple applications may be replicated to the same replica virtual machine. Embodiments of the invention create a relationship between availability (e.g., in the context of a recovery operation or the like) and cost that can be balanced. Embodiments of the invention relate to static and/or dynamic strategies for optimizing the manner in which virtual machines are shared and the manner in which applications are protected. Balancing the relationship between cost and availability can impact performance when a disaster or other problem occurs. FIG. 1 illustrates an initial example of a data protection operation such as replication for reducing RTO.

Figure 2:
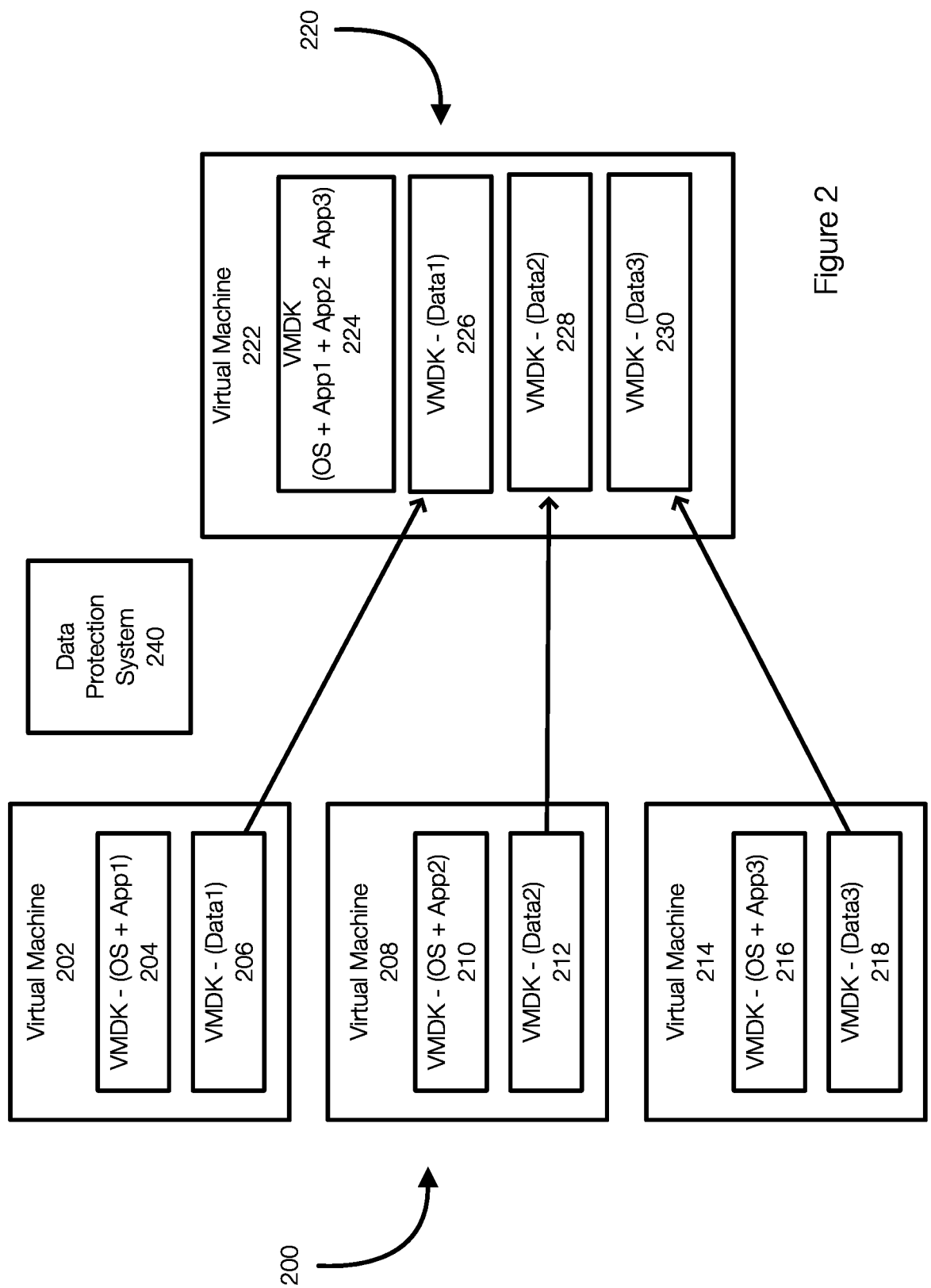
FIG. 2 illustrates an example of a data protection system where multiple production applications associated with one or more virtual machines and their virtual disks are replicated to the same replica virtual machine.

FIG. 2 illustrates an example of sharing a replica virtual machine with multiple applications. These applications shared at the replica virtual machine can be run on separate virtual machines at the production site or shared at the production site (e.g., production virtual machines at a production datacenter, or the like). FIG. 2 thus illustrates an example of sharing a replica virtual machine in order to protect multiple applications/virtual machines.

Replicating a virtual machine or replicating an application often have the same effect. The actual data replicated may depend on implementation. However, replicating a virtual machine or replicating an application typically conveys replicating the data associated with the application. The OS and application binary may already be present on the replica virtual machines at the replica site and do not necessarily need to be replicated.

FIG. 2 illustrates a production site 200 that includes production virtual machines 202, 208, and 214. In this example, the virtual machine 202 is associated with OS virtual disk 204 that includes the OS and app1. The virtual machine 208 includes a virtual disk 210 that includes an OS and app2. The virtual machine 214 includes a virtual disk 216 that includes an OS and app3. The data for app1, app2, and app3 are stored, respectively, on virtual disks 206, 212, and 218.

A data protection system 240 may be configured to replicate virtual disks 206, 212, and 218 (or the changes made to these virtual disks once a baseline is established) to replica virtual disks 226, 228, and 230. The virtual disk 224 may include an OS and binaries of app1, app2, and app3. Further, the OS on the virtual disk 224 may or may not be the same as the OSes on the virtual disks 204, 210, and 216. As long as a similar OS is sufficient for app1, app2, and app3, various sharing strategies can be implemented. If the OS version or type is a hard dependency, this may impact the manner in which a replica virtual machine is used for replication. More specifically, the OS system may impact which of the apps and production virtual machines can share the same replica virtual machine when the OS is a hard dependency.

More generally, a typical cloud or datacenter may have large numbers of applications running on separate virtual machines. As a result, the replica virtual machines can share the applications of a production site in a large number of combinations. Some replica virtual machines, for example, may contain M applications while other replica virtual machines may contain fewer or more applications. In some instances, embodiments of the invention ensure that a replica virtual machine only has a single application replicated thereto.

Figure 3:
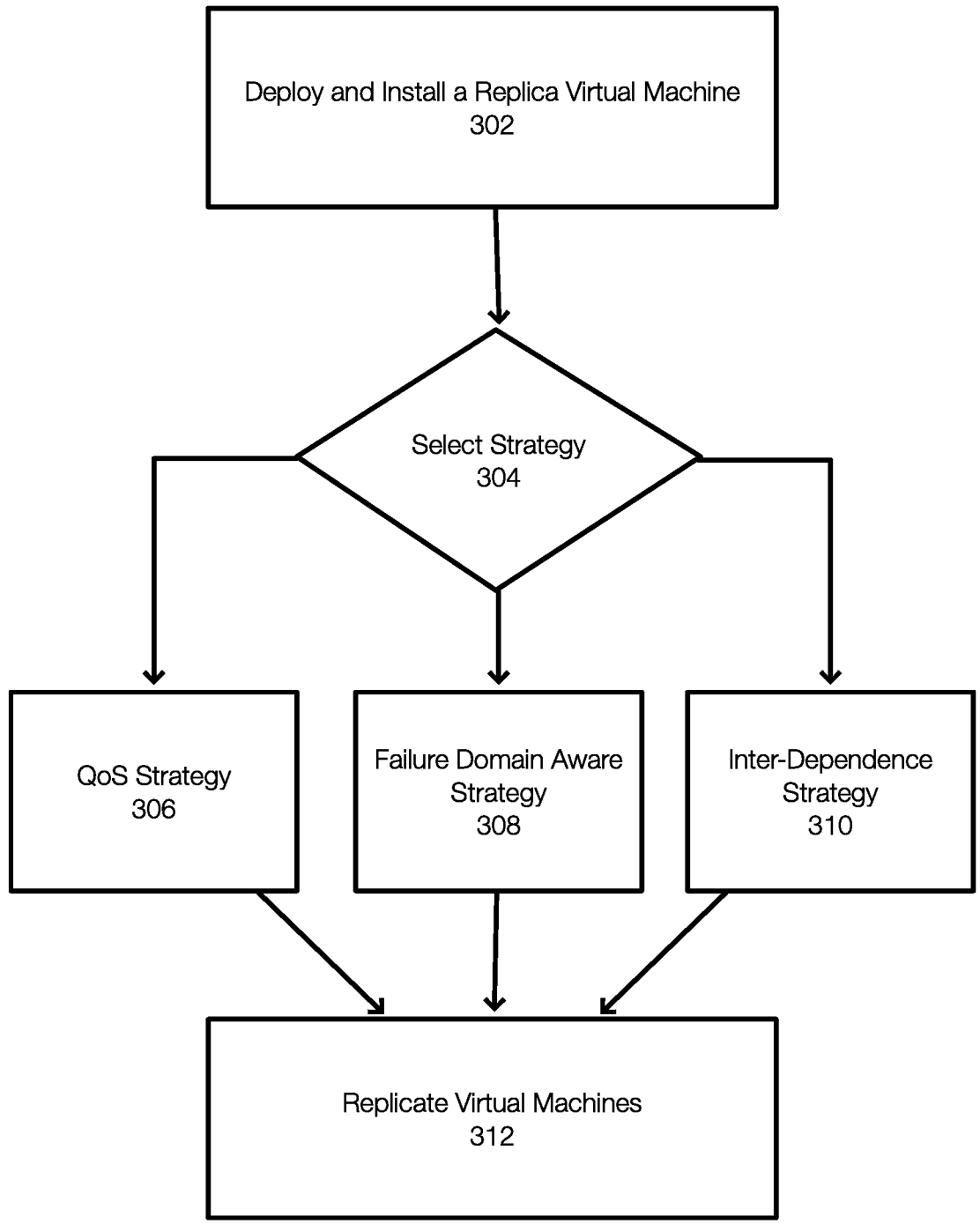
FIG. 3 illustrates an example of a method for replicating applications using a replication strategy.

FIG. 3 illustrates an example of a method for sharing a replica virtual machine with multiple applications. In this example, a replica virtual machine may be deployed and installed 302 in a computing environment such as a cloud or datacenter. When the virtual machine is deployed, the OS virtual disk should be large enough to contain M app binaries or a variable number of binaries. The data protection system may place a limit on the number of applications that the replica virtual machine may store or share. In addition to storing M app binaries, the OS should also have the storage to store logs and the like. The OS virtual disk should also have storage for later use if necessary.

Next or if the virtual machines at the replica site have been previously installed/deployed, a strategy is selected 304 for replicating production apps and/or their data to the replica virtual machine. The strategy may include a QoS strategy 306, a failure domain aware strategy 308, or a related application or inter-dependent strategy 310. In some examples, more than one strategy may be used to replicate the production virtual machines. These strategies are discussed later.

A replication engine of a data protection system (e.g., RP4VMs) may replicate 312 production data virtual disks or volumes of the M binaries stored on the replica virtual machine to corresponding disks or volumes on the replica virtual machine. As previously selected, the M binaries or apps may be selected according to a strategy. The apps replicated to the replica virtual machine may be in separate consistency groups by way of example only. As a result, each app may be associated with a separate any-PiT journal and may be recovered independently of other apps.

In some examples, the application and its data may be stored on the same virtual disk. If the applications are not installed together with their data, the applications 1-M may be installed on the OS disk. In some embodiments, the apps are typically turned off. If supported, the app may be in a running state which allows the replica virtual data disk to be mounted at a later time.

As a result, the M production applications are protected to one replica virtual machine and the M applications share the same replica virtual machine. FIG. 2, for example, illustrates that three applications (app1, app2 and app3) are replicated to one replica virtual machine. Stated differently, these three applications in FIG. 2 share the same replica virtual disk for replication.

When applications share a replica virtual disk, the apps protected to the same replica virtual machine should be able to run together. For example, the apps on the replica virtual machine should use the same or similar OS, on which they can run. In addition, the applications should support the same hardware with which the replica virtual machine (e.g., CPU architecture) is configured. If supported by the application, more than one instance of the application can run on the replica virtual machine. If not supported, multiple instances of the application will not be placed on the same replica virtual machine in one example.

Embodiments of the invention may also consider licenses when replicating production applications. For example, an application license may limit an application to a specific hardware ID of a virtual machine. In this case, the application cannot reside on the same replica virtual machine as another application with the same restriction because there is only one hardware ID for the replica virtual machine. However, there are cases where more than one instance of a hardware ID exists on a replica virtual machine. For example, MAC addresses with multiple network cards and hard disks smart ID with multiple virtual disks may allow multiple apps to be supported.

Embodiments of the invention may also consider networking constraints. A virtual machine may have several network cards (NICs) and more than one IP address per NIC. If an application requires a specific IP address, the address can be attached to the replica virtual machine when the application is run. In addition, applications that serve incoming traffic (e.g., web pages), can bind to different IP and port pairs and can work together. If two applications do not work together (e.g., they must bind a specific port on the first NIC) these applications are not placed on the same replica virtual machine. These constraints are typically considered when replicating production applications to replica virtual machines.

By way of example, a replication strategy may generate a topology. More specifically, the topology suggests which production virtual machines are replicated to which replica virtual machines. The topology may describe the manner in which the replica disks are organized. For example, replica disk 1 is used to replicate app1 including data1, replica disk 2 is used to replicate app2, app3, app4 including data2, data3, and data4, etc.

Replication Strategies—Quality of Service

Figure 4:
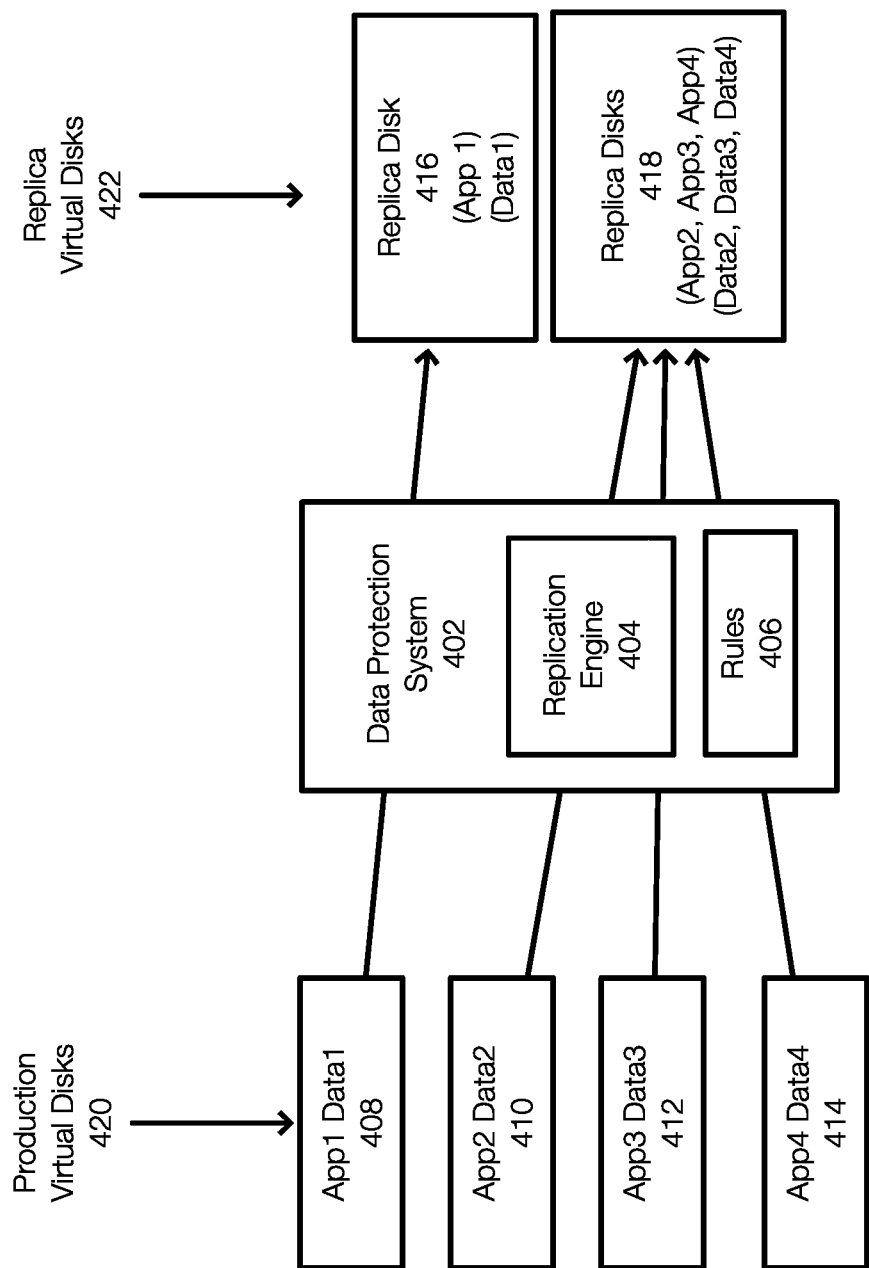
FIG. 4 illustrates and example of a data protection system that replicates production applications to replica virtual machines using a replication strategy that uses metrics.

FIG. 4 illustrates an example of a data protection system that replicates, by way of example only, virtual machines, applications, and/or application data from a production site to a replica site. While FIG. 4 is illustrated in terms of virtual disks, each of these virtual disks is associated with a virtual machine. The production virtual disks 420 may each be associated with a different virtual machine. The replica disk 418 may represent multiple virtual disks that are associated with the same virtual machine.

FIG. 4 further illustrates an example of a strategy for replicating virtual machines, applications, and/or application data. A data protection system 402 may be configured to replicate data from production virtual disks 420 to replica virtual disks 422. In this example, the replication engine 404 is configured to replicate the production virtual disks 420 according to a strategy that is referred to as a quality of service (QoS) or a metric strategy. In one example, the replication engine 404 may include a splitter and other components that are configured to replicate data according to the strategy.

In this example, the production virtual disks 420 include virtual disks 408, 410, 412, and 414. The disk 408 includes an app1 and/or data1. Similarly, the disks 410, 412, and 414 include, respectively, app2/data2, app3/data3, and app4/data4. However, the data and the associated app may be on separate disks. For example, the app may be on the OS disk as previously discussed. In one example, the data is replicated because the binaries of the applications may not need to be replicated and may be stored on the relevant disk.

The QoS strategy, when implemented, causes the replication engine 404 to replicate the disk 408 to the replica disk 416. The replication engine 404 replicates the disks 410, 412, and 414 to the same replica virtual disk 418. Thus, app2, app3, and app4 share the same replica virtual disk 418.

The QoS strategy illustrated in FIG. 4 allows an entity to identify applications based on their importance to the entity. In other words, the applications could be ranked on a variety of factors either by input from an administrator or automatically using factors such as usage, resource consumption or requirements, criticality, or the like. In one example, these factors and other characteristics may be embodied as rules 406. For example, a rule may reflect user input specifying the importance of an application. In this example, app1 is deemed more important than the app2, app3, and app4. The important of an app may be presented as a priority. As a result, the app1 is associated with its own replica virtual disk 416 because it has a higher priority that the other apps and/or because the priority is higher than a threshold priority. The rules 406 may also account for restrictions and constraints (e.g., license, networking, OS) previously discussed.

In other words, to achieve higher performance, at least in terms of recovery, the replica virtual disk 416 is not shared with any other applications and is configured to support a single application. Alternatively, certain replica virtual disks may have a limit on the number of applications that share those replica virtual disks. In one example, the applications may each be associated with a value M. The M value of a first application indicates how many other applications the first application can share a replica virtual machine with. If the app1 has an M value of 1, this rule indicates that the app1 should have a dedicated replica virtual disk, as illustrated in FIG. 4. In this example, app2, app3, and app4 each have an M value of at least 3.

Using a single replica virtual machine for several applications has cost benefits when production virtual machines are operating properly, but has performance consequences when recovery is required. As a result, more important apps are typically replicated to dedicated virtual machines or to virtual machines that are limited in the number of applications replicated thereto.

Figure 5:
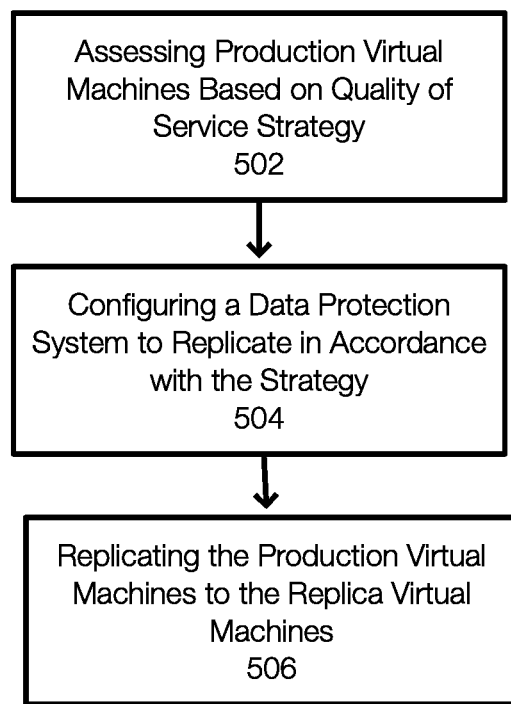
FIG. 5 illustrates an example of a method for replicating applications using a metric based replication strategy.

FIG. 5 illustrates an example of a method for implementing a replication strategy. FIG. 5 further illustrates an example of replicating virtual machines (or applications and/or data thereof) from a production site to a replica site. Initially, the production virtual machines (or the applications running thereon) are assessed 502 based on a strategy such as a Quality of Service strategy or using another metric or combinations of metrics. This metric allows comparatively more important applications to be replicated differently. The metric may be expressed, in one example, using a value. This value may be determined for each of the applications. The value identifies, with respect to an application, how many other applications can be replicated to the same virtual machine. For example, if an application has a value of 1, then that application is replicated to its own or a dedicated replica virtual machine. If an application has a value of 3, then the replica virtual machine to which that application is replicated can also be used to replicate at least two more applications. Thus, that replica virtual machine may be used to replicate three applications (as long as the values of the other applications are also at least 3).

The assessment 502 is able to divide the applications being replicated into subsets. Each subset is replicated to a corresponding replica virtual machine. If a subset includes a single application, then that application is the only application replicated to a particular replica virtual machine. If a subset includes 3 applications, those 3 applications are replicated to the same replica virtual machine.

Once the assessment is completed, the data protection system may be configured 504 to replicate the applications in accordance with the strategy. This may include deploying and installing the replica virtual machines, configuring or reconfiguring existing replica virtual machines, or the like.

Next, the production virtual machines (or their applications and data) are replicated to the replica virtual machines. Often, the application may not need to be replicated. Rather, the binary can simply be stored on the replica virtual disk of the virtual machine along with the OS. Typically, replication involves replicating the IOs that occur with respect to an application's data.

Replication Strategies—Failure Domain Aware Strategy

Figure 6:
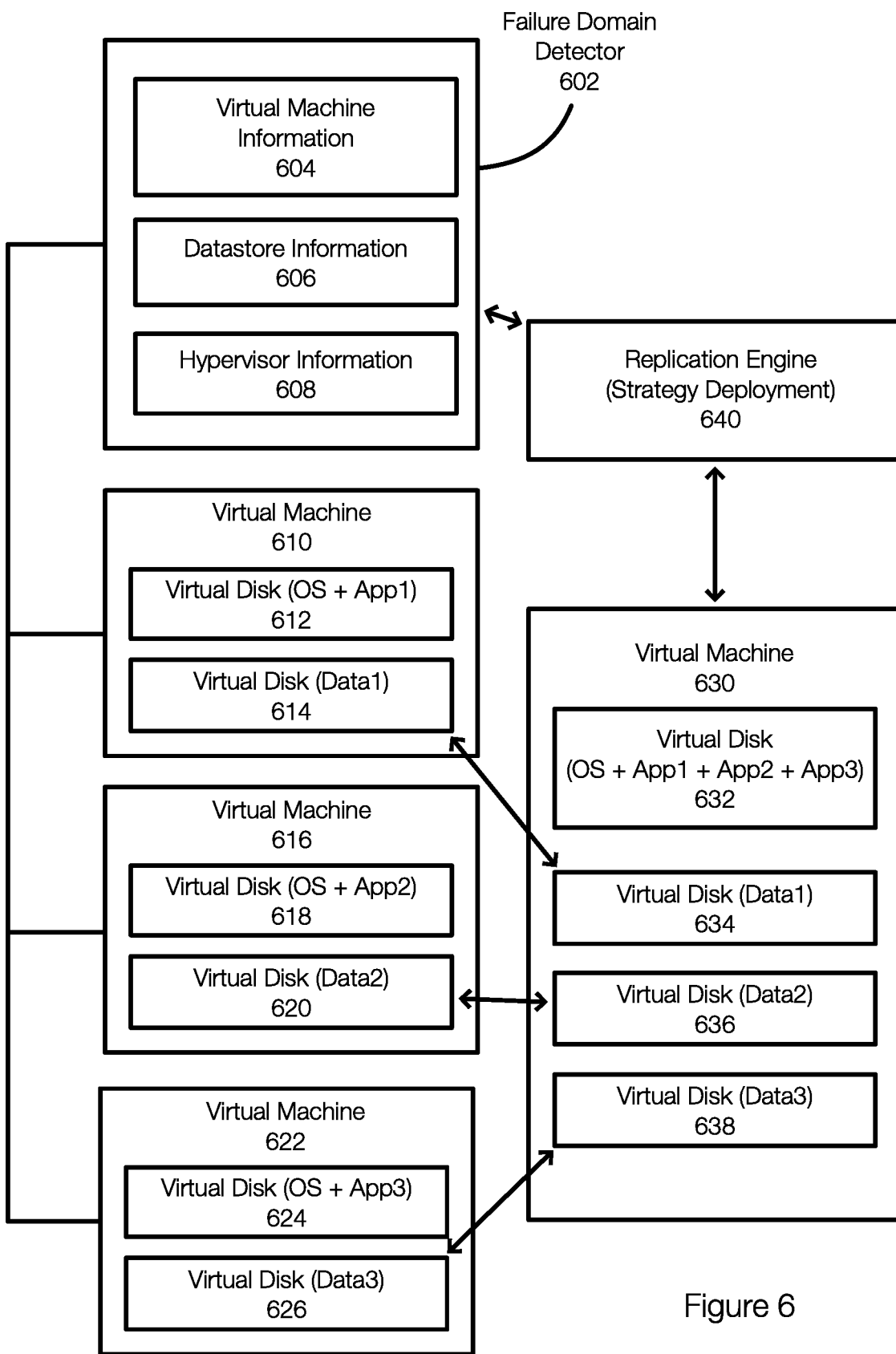
FIG. 6 illustrates an example of a data protection system configured to replicate applications using a failure domain based replication strategy.

FIG. 6 illustrates an example of a data protection system configured to replicate data according to a strategy such as a failure domain aware strategy. FIG. 6 illustrates components of a data protection system including a failure domain detector 602 and a replication engine 640. These components are involved in replicating data from production virtual machines 610, 616, and 622 to a replica virtual machine 630.

As illustrated in FIG. 6, the virtual machine 610 is associated with a virtual disk 612 that may include an OS and app1. The virtual disk 614 includes data1 associated with app1. Similarly, the virtual disk 618 includes the OS and app2 and the virtual disk 620 stores data2 associated with app2. The virtual disk 624 stores the OS and app3 and the virtual disk 626 stores data3 associated with the app3.

In this example, the failure domain detector 602 may collect information about the virtual machines 610, 616, and 622. The failure domain detector 602 may collect, by way of example only, virtual machine information 604, datastore information 606, and hypervisor information 608. The collection may be repeated such that the assessment can be reevaluated at times.

By way of example only, the virtual machine information 604 may include IP information for each of the virtual machines. The datastore information 606 may include or identify the physical datastores associated with the virtual machines. The hypervisor information 608 may include or identify the host hypervisors for the virtual machines 610, 616, and 622.

The replication engine 640 may evaluate, assess, or analyze the virtual machine information 604, the datastore information 606, and the hypervisor information 608 to determine how the virtual machines 610, 616, and 622 or the app1, app2 and app3 and associated data1, data2, and data3 should be replicated. The replication engine 640 takes this information into account when generating recommendations on how to perform replication or when replicating.

More specifically, the replication engine 640 may recommend that virtual machines belonging to the same failure domain should be replicated to different replica virtual machines. Alternatively, the replication engine 640 may recommend that virtual machines belonging to different failure domains be replicated to the same replica virtual machine.

FIG. 6 illustrates an example where the virtual machines 610, 616, and 622 belong to different failure domains and can be replicated to the same virtual machine 630. Thus, the replica virtual machine includes a virtual disk 632 for the OS and app1, app2, and app3. The replica virtual machine 630 also include virtual disks 634, 636, and 638 for, respectively, replicating data1, data2, and data3.

A failure domain, by way of example, indicates how a failure may impact the virtual machines and/or applications. More specifically, the replication engine 640 may evaluate the information 604, 406 and 608 to determine which of the production virtual machines belong to the same failure domain. For example, the replication engine 640 may determine, from the information 604, 606, and/or 608, that the virtual disk 612 and the virtual disk 618 (OS disks for virtual machines 610 and 616) are both allocated from the same datastore. As a result, a problem with the datastore X (e.g., device failure) will impact both the virtual machine 610 and the virtual machine 616. In this case, the replication engine 640 may decide to replicate the virtual machines 610 and 616 to different replica virtual machines. Similarly, virtual machines that share the same hypervisor are in the same failure domain and may be replicated to different replica virtual machines. In effect, virtual machines that are impacted by a specific event may be in the same failure domain, whether the event relate to a physical device, a hypervisor issue, an IP or network concern, or the like.

More specifically, if M production virtual machines are in the same failure domain (e.g., deployed on the same hypervisor system, share the same datastore), these virtual machines are likely to experience problems or disasters at the same time. For example, when a datastore has a hardware problem or a connectively issue or a hypervisor fails and is unavailable, all of the production virtual machines or applications are affected and may need to be failed over. If these production virtual machines have been replicated to the same replica virtual machine, then the performance of the failover or recovery operation is adversely affected by the need to recover or failover multiple applications at the same time on the same replica virtual machine.

By accounting for failure domains when replicating, the performance of the recovery or failover operations is improved. More specifically, if these virtual machines in the same failure domain are replicated to different replica virtual machines, the recovery or failover performance improves.

Figure 7:
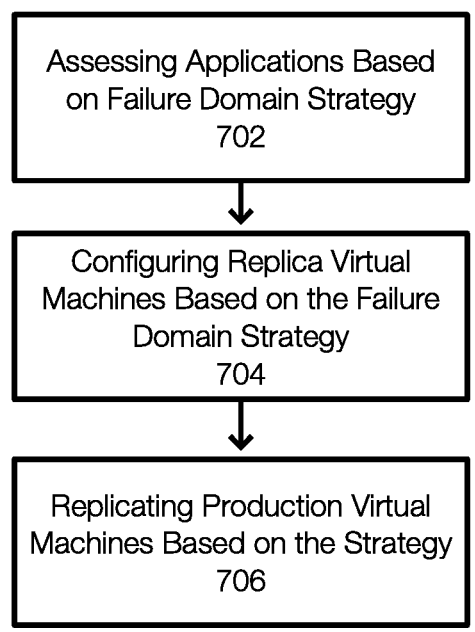
FIG. 7 illustrates an example of a method for replicating applications using a failure domain based replication strategy.

FIG. 7 illustrates an example of a method for replicating applications using a strategy such as a failure domain aware strategy. The method shown in FIG. 7 may begin by assessing 702 applications based on a failure domain or a failure domain aware strategy. This may include identifying the applications operating at a production site, identifying which applications are associated with which hypervisors, determining which datastores are associated with which applications or operating systems, identifying IP relationships shared or present among the applications or virtual machines.

More generally, the failure domain strategy identifies virtual machines, applications and/or application data that would be affected should a problem occur with regard to hardware, software, hypervisors, networking components or characteristics or the like. For example, virtual disks on the same datastore would likely all be impacted by an issue with the datastore. Applications or operating systems on the same hypervisor would all be impacted by an issue with the hypervisor.

The assessment 702 identifies subsets or groups of applications/virtual machines/application data based on these types of failure domains. Generally, this assessment ensures that the applications/virtual machines/application data in the same failure domain are not assigned or replicated to the same replica virtual machine. Similarly, applications/virtual machines/application data that are not part of the same failure domain may be allowed to share the same replica virtual machine.

This strategy may improve the performance of any failover or recovery operation. If applications from the same failure domain are on the same replica virtual machine, the recovery is likely slowed because multiple applications are being failed over or recovered on the same replica virtual machines. If the applications on a replica virtual machine are associated with different failure domains, then failover or recovery may not involve multiple applications on the same replica virtual machine.

Next, the replica virtual machines are configured 704 based on the strategy. Thus, each replica virtual machine may be prepared or reconfigured, if necessary, to replicate a subset of the production applications. Next, the production virtual machines (or application data) is replicated 708 based on the strategy from the production virtual machines to the replica virtual machines.

Replication Strategies—Related Application Strategy

By way of example, the applications of a production site may be related to or depend on other applications. Further, the applications of a production site may also be distributed. Because these applications are related or interdependent, it is often useful to failover all of the related applications, even when only one of the applications fails or has an issue.

Figure 8:
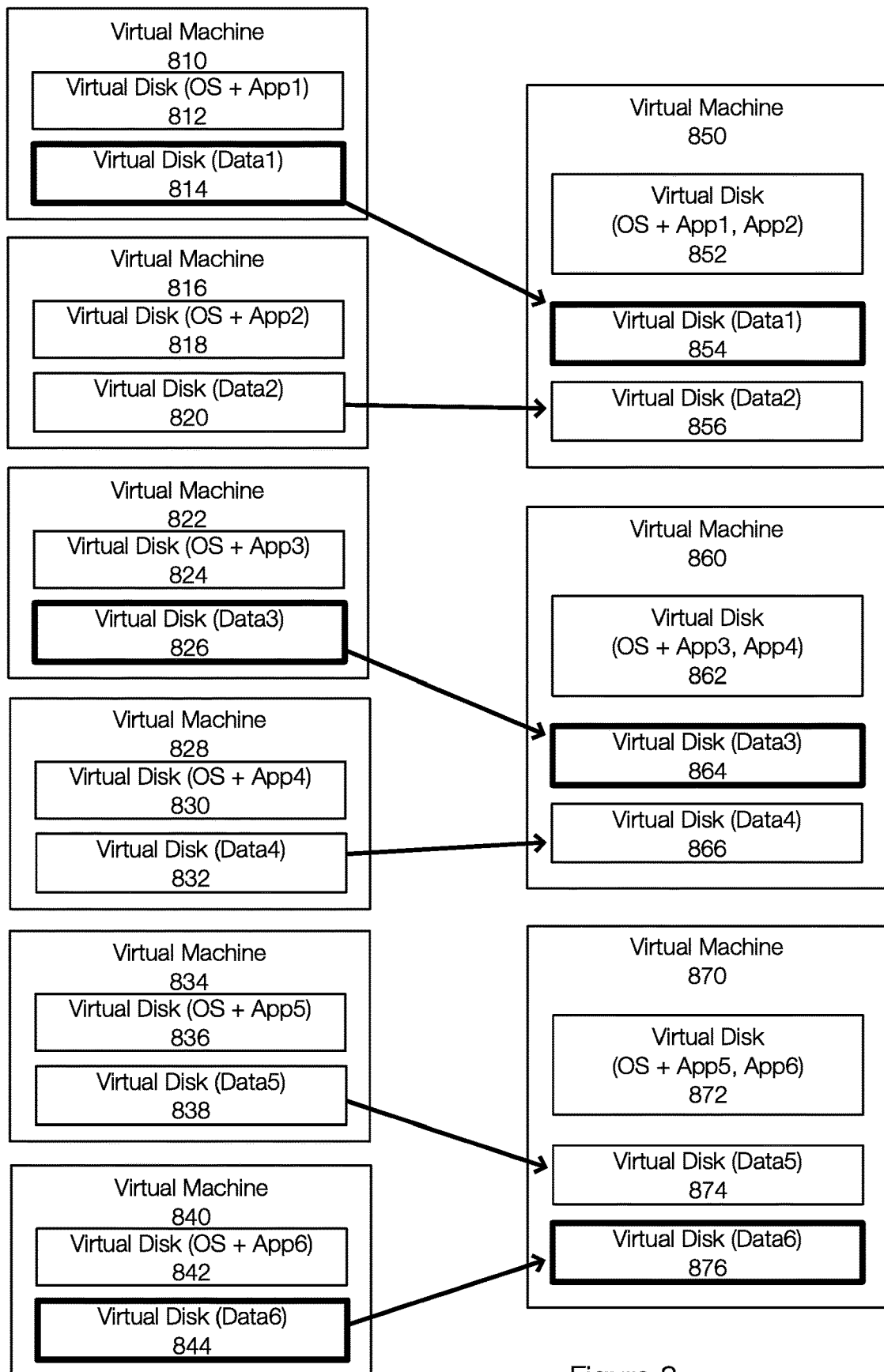
FIG. 8 illustrates an example of a data protection system configured to replicate applications using a related application based replication strategy.

FIG. 8 illustrates an example of replicating using a replication strategy that accounts for application relationships or interdependencies. FIG. 8 illustrates production virtual machines 810, 816, 822, 828, 834, and 840. These production virtual machines include, by way of example only, an OS/app virtual disk and a data virtual disk. The OS and app1, for example, are associated with the virtual disk 812 and the data of the application is stored on or associated with the virtual disk 814. The OS/app disks and data disks include, as illustrated in FIG. 8, virtual disks 818, 820 for the virtual machine 816, virtual disks 824 and 826 for the virtual machine 822, virtual disks 830 and 932 for the virtual machine 828, virtual disks 836 and 838 for the virtual machine 834, and virtual disks 842 and 844 for the virtual machine 840.

FIG. 8 further illustrates that applications app1, app3, and app 6 are related. For example, app1 may be a web layer, app3 may be a logic layer, and app6 may be a database layer of a multi-layer deployment. If there is a disaster that impacts only app6 (or the data of app6), it may be necessary to failover app6 to the replica site or to a replica virtual machine.

However, failing over only the virtual machine 840 (or the app6) may create a latency between the applications running on the production site and the application running on the replica site. This latency may be unacceptable for various reasons. As a result, it may be desirable to failover all of the related applications.

As illustrated in FIG. 8, an application interdependency or related application replication strategy ensures that related applications are replicated to different virtual machines. In this example, the virtual disk (or data1) is replicated to the virtual disk 854 of the virtual machine 850, the data3 is replicated to the virtual machine 860, and the data6 is replicated to the virtual disk 876 of virtual machine 870.

In this example, if any of the app1, app3, and app6 require failover, all of the related apps are failed over. This improves performance at least because the related applications are all operating at the failover or replica site. This allows the production site to become the replica site as well in one example. This allows the related applications to failback if necessary or when needed.

Figure 9:
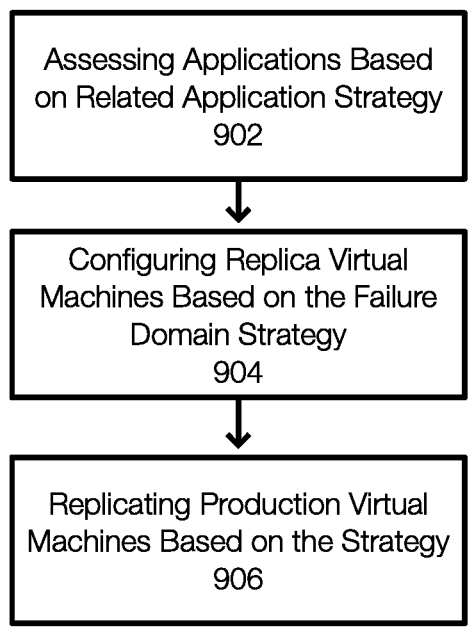
FIG. 9 illustrates an example of a method for replicating applications using a related application based strategy replication strategy.

FIG. 9 illustrates an example of a method for replicating applications/virtual machines/application data using a replication strategy such as an interdependent application strategy.

FIG. 9 begins by assessing 902 applications operating at a production site based on a related application strategy (also referred to an application inter-dependence strategy). The applications are assessed by identifying related applications. For example, many larger applications operate in pieces or layers and each layer may correspond to an application. As previously state, an application may include a multi-layer deployment that includes various layers operating on virtual machines of a production site (e.g., a cloud, datacenter, or the like). These applications are grouped together and the replication engine may ensure that these applications are replicated to different virtual machines. When replicating related applications, the replica virtual machines may be the target of multiple applications. As long as none of the applications are related, operationally, this may be allowed using the related application strategy. A limit on the number of applications replicated to a particular replica virtual machine may be capped or limited.

Thus, as illustrated in FIG. 8, the data2 on the virtual disk 824 is replicated to the virtual disk 866 and the virtual disk 862 of the virtual machine 860 may be an OS disk and include a copy or binary of app3 and app4. However, the data3 and the data4 are not related or part of the same overall application.

Similarly, the data2 is replicated to the virtual disk 856 of the virtual machine 850 and the virtual disk 852 may include the OS as well as binaries of app1 and app2. Also, the data5 may be replicated to the virtual disk 874 and the virtual disk 872 of the virtual machine 870 may be an OS disk and store binaries of app5 and app6.

In some examples of the replication strategies, the applications on the OS disks may be operational. This shortens the RTO and allows the data disks to simply be mounted during failover or disaster recovery or for other event.

If the related apps are all replicated to the same virtual machine, the performance of the overall application may suffer from a performance perspective due to low resources. Further, failing all of the related applications to the same replica virtual machine may also impact the performance of the failover operation because a single virtual machine is performing failover for multiple related applications at the same time.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. The scope of the invention embraces any operating environment in which the disclosed concepts may be useful.

At least some embodiments of the invention provide for the implementation of the disclosed functionality in existing data protection platforms, examples of which include RecoverPoint for VMs. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for replicating a production site to a replica site, the method comprising assessing, by a data protection system, applications operating on production virtual machines based on a replication strategy, wherein the replication strategy is configured to identify failure domains and ensure that applications in the same failure domain are replicated to different replica virtual machines, and replicating the applications from production virtual machines at the production site to the replica virtual machines according to the replication strategy.

Embodiment 2. The method of embodiment 1, further comprising replicating the applications such that applications in the same failure domain are replicated to the different replica virtual machine.

Embodiment 3. The method of embodiment 1 and/or 2, further comprising identifying the failure domains in the production site, the failure domains including one or more of datastores, hypervisors, and IP addresses.

Embodiment 4. The method of embodiment 1, 2, and/or 3, wherein applications that are associated with the same hypervisor, the same datastore, or the same IP address are associated with the same failure domain, wherein applications that share the same hypervisor are in a first failure domain, applications that share the same datastore are in a second failure domain, and applications that share the same IP address are in a third failure domain.

Embodiment 5. The method of embodiment 1, 2, 3, and/or 4, wherein some of the failure domains overlap with each other in terms of applications.

Embodiment 6. The method of embodiment 1, 2, 3, 4, and/or 5, further comprising dividing the applications into subsets of applications based on the assessment, wherein applications in the same subset have no common failure domain.

Embodiment 7. The method of embodiment 1, 2, 3, 4, 5, and/or 6, further comprising replicating each subset to a different replica virtual machine.

Embodiment 8. The method of embodiment 1, 2, 3, 4, 5, 6, and/or 7, further comprising accounting for networking constraints, operating system constraints, license constraints, and/or hardware constraints when assessing the applications.

Embodiment 9. The method of embodiment 1, 2, 3, 4, 5, 6, 7, and/or 8, wherein the replication strategy includes one or more of replicating applications associated with the same hypervisor to different replica virtual machines, replicating applications or data of the applications associated with the same data store to different replica virtual machines, replicating applications associated with the same IP addresses to different replica virtual machines, or replicating applications whose associated operating system disks are associated from the same datastore to different replica virtual machines.

Embodiment 10. The method of embodiment 1, 2, 3, 4, 5, 6, 7, 8, and/or 9, further comprising determining which applications can share the same replica virtual machine.

Embodiment 11. A. method for performing any of the operations, methods, or processes, or any portion of any of these embodiments, disclosed herein.

Embodiment 12. A non-transitory storage medium having stored therein instructions that are executable by one or more hardware processors to perform the operations of any one or more of embodiments 1 through 11

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed in herein.

An example of physical computing device may include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating a applications operating on production virtual machines at a production site to a plurality of replica virtual machines at replica site, the method comprising:
   identifying, by a data protection system, a plurality of applications operating at the production site;
   assessing, by a the data protection system, the plurality of applications based on a replication strategy wherein the assessing includes:
      for each application in the plurality of applications, determining one or more hypervisors, one or more datastores, and one or more internet protocol (IP) addresses associated with each application;
   identifying failure domains for each application in the plurality of applications in accordance with the replication strategy, wherein the replication strategy ensures: (1) applications are assigned to a same failure domain if they are associated with one or more criteria, wherein the criteria includes having a same IP address, (2) applications in the same failure domain are replicated to different replica virtual machines, and (3) applications that are not assigned to the same failure domain are allowed to be replicated to a same replica virtual machine;
   dividing the plurality of applications into two or more subsets of applications according to the replication strategy, wherein each subset of applications can be replicated to the same replica virtual machine; and
   creating a single topology for the two or more subsets of applications suggesting a respective replica virtual machine in the plurality of replica virtual machines to which each subset of applications in the two or more subsets of applications should be replicated; and
   replicating, by the data protection system, the plurality of applications from the production virtual machines at the production site to the replica virtual machines in the plurality of virtual machines according to the created single topology.

2. The method of claim 1, wherein applications in the same failure domain are replicated to the different replica virtual machine.

3. The method of claim 1, the failure domains include one or more of datastores and hypervisors.

4. The method of claim 1, wherein some of the failure domain overlap with each other in terms of applications.

5. The method of claim 1, further comprising dividing the applications into subsets of applications based on the assessment, wherein applications in the same subset have no common failure domain.

6. The method of claim 5, further comprising replicating each subset to a different replica virtual machine.

7. The method of claim 5, further comprising accounting for networking constraints, operating system constraints, license constraints, and/or hardware constraints when assessing the applications.

8. The method of claim 1, wherein the replication strategy includes one or more of:
   replicating applications or data of the applications associated with the same datastore to different replica virtual machines;
   replicating applications whose associated operating system disks are associated from the same datastore to different replica virtual machines.

9. The method of claim 1, further comprising determining which applications can share the same replica virtual machine.

10. A non-transitory storage medium having stored therein instructions that are executable by one or more hardware processors to perform operations for replicating applications operating on production virtual machines at a production site to a plurality of replica virtual machines at replica site, wherein the non-transitory storage is not a signal, the method comprising:
   identifying, by a data protection system, a plurality of applications operating at the production site;

assessing, by a the data protection system, the plurality of applications based on a replication strategy, wherein the assessing includes:
  for each application in the plurality of applications, determining one or more hypervisors, one or more datastores, and one or more internet protocol (IP) addresses associated with each application;
  identifying failure domains for each application in the plurality of applications in accordance with the replication strategy, wherein the replication strategy ensures: (1) applications are assigned to a same failure domain if they are associated with one or more criteria, wherein the criteria includes having a same IP address, (2) applications in the same failure domain are replicated to different replica virtual machines, and (3) applications that are not assigned to the same failure domain are allowed to be replicated to a same replica virtual machine;
  dividing the plurality of applications into two or more subsets of applications according to the replication strategy, wherein each subset of applications can be replicated to the same replica virtual machine; and
  creating a single topology for the two or more subsets of applications suggesting a respective replica virtual machine in the plurality of replica virtual machines to which each subset of applications in the two or more subsets of applications should be replicated; and
  replicating, by the data protection system, the plurality of applications from the production virtual machines at the production site to the replica virtual machines in the plurality of virtual machines according to the created single topology.

11. The non-transitory storage medium of claim 10, wherein applications in the same failure domain are replicated to the different replica virtual machine.

12. The non-transitory storage medium of claim 10, wherein the failure domains include one or more of datastores and hypervisors.

13. The non-transitory storage medium of claim 10, wherein some of the failure domains overlap with each other in terms of applications.

14. The non-transitory storage medium of claim 10, the operations further comprising dividing the applications into subsets of applications based on the assessment, wherein applications in the same subset have no common failure domain.

15. The non-transitory storage medium of claim 14, the operations further comprising replicating each subset to a different replica virtual machine.

16. The non-transitory storage medium of claim 14, the operations further comprising accounting for networking constraints, operating system constraints, license constraints, and/or hardware constraints when assessing the applications.

17. The non-transitory storage medium of claim 10, wherein the replication strategy includes one or more operations of:
  replicating applications or data of the applications associated with the same datastore to different replica virtual machines;
  or
  replicating applications whose associated operating system disks are associated from the same datastore to different replica virtual machines.

18. The non-transitory storage medium of claim 10, the operations further comprising determining which applications can share the same replica virtual machine.

* * * * *